United States Patent
Gwon et al.

(10) Patent No.: US 11,364,877 B2
(45) Date of Patent: Jun. 21, 2022

(54) WIPER LINKAGE SYSTEM

(71) Applicants: HYUNDAI MOTOR COMPANY, Seoul (KR); KIA MOTORS CORPORATION, Seoul (KR); DY AUTO Corporation, Asan-si (KR)

(72) Inventors: Su-Hak Gwon, Gyeongju-si (KR); Il-Soo Kim, Suwon-si (KR); Seong-Jin Hong, Asan-si (KR); Jung-Kwan Choi, Asan-si (KR)

(73) Assignees: HYUNDAI MOTOR COMPANY, Seoul (KR); KIA MOTORS CORPORATION, Seoul (KR); DY AUTO Corporation, Asan-si (KR)

( * ) Notice: Subject to any disclaimer, the term of this patent is extended or adjusted under 35 U.S.C. 154(b) by 0 days.

(21) Appl. No.: 16/931,085

(22) Filed: Jul. 16, 2020

(65) Prior Publication Data
US 2021/0179026 A1 Jun. 17, 2021

(30) Foreign Application Priority Data
Dec. 13, 2019 (KR) .......................... 10-2019-0166697

(51) Int. Cl.
*B60S 1/34* (2006.01)
*B60S 1/26* (2006.01)
*B60S 1/04* (2006.01)

(52) U.S. Cl.
CPC .............. *B60S 1/26* (2013.01); *B60S 1/0452* (2013.01); *B60S 1/34* (2013.01)

(58) Field of Classification Search
CPC .... B60S 1/3427; B60S 1/3431; B60S 1/3409; B60S 1/24; B60S 1/0433; B60S 1/0452; B60S 1/34; B60S 1/18; B60S 1/06; Y10T 74/18184; Y10T 74/182
USPC .... 15/250.27, 250.21, 250.31, 250.3, 250.23
See application file for complete search history.

(56) References Cited

U.S. PATENT DOCUMENTS

| | | |
|---|---|---|
| 7,251,852 B2 | 8/2007 | Metz |
| 7,257,856 B2 | 8/2007 | Zimmer |
| 7,420,346 B2 | 9/2008 | Metz |
| 2017/0197590 A1 * | 7/2017 | Caillot .................. B60S 1/3484 |

FOREIGN PATENT DOCUMENTS

| | | | |
|---|---|---|---|
| KR | 20-0171220 Y1 | 12/1999 | |
| WO | WO-2018099385 A1 * | 6/2018 | ................ B60S 1/24 |

* cited by examiner

*Primary Examiner* — Katina N. Henson
(74) *Attorney, Agent, or Firm* — Lempia Summerfield Katz LLC

(57) ABSTRACT

A wiper linkage system directly transmits rotating force of a motor to one wiper arm. The wiper linkage system includes: a gear housing installed on a wiper motor, a pipe rod installed on the gear housing, a crank arm installed on an output shaft of the wiper motor, a first wiper arm installed on a first end of the crank arm by a rotating shaft, a pivot housing assembled with the pipe rod, and a second wiper arm operated by a link structure including a link unit coupled to a second end of the crank arm and the pivot housing. In particular, a first end of the pipe rod is fixed to a vehicle body by a pipe mounting.

3 Claims, 8 Drawing Sheets

FIG. 1 "PRIOR ART"
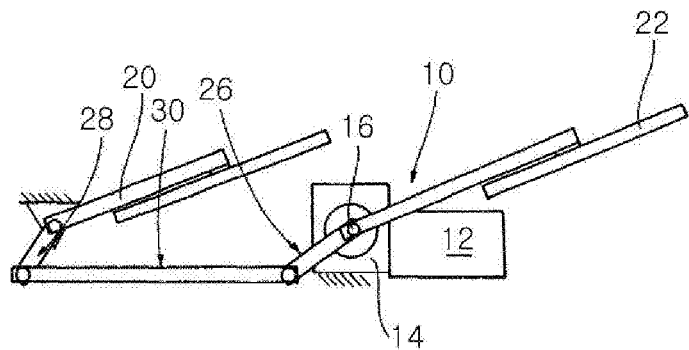
FIG. 2 "PRIOR ART"
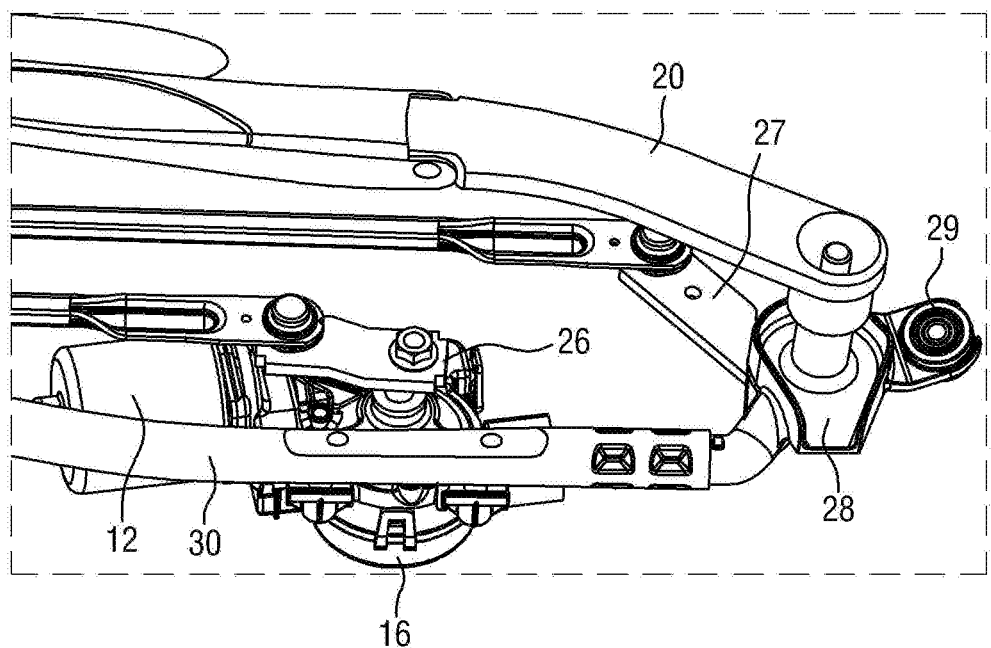

FIG. 5
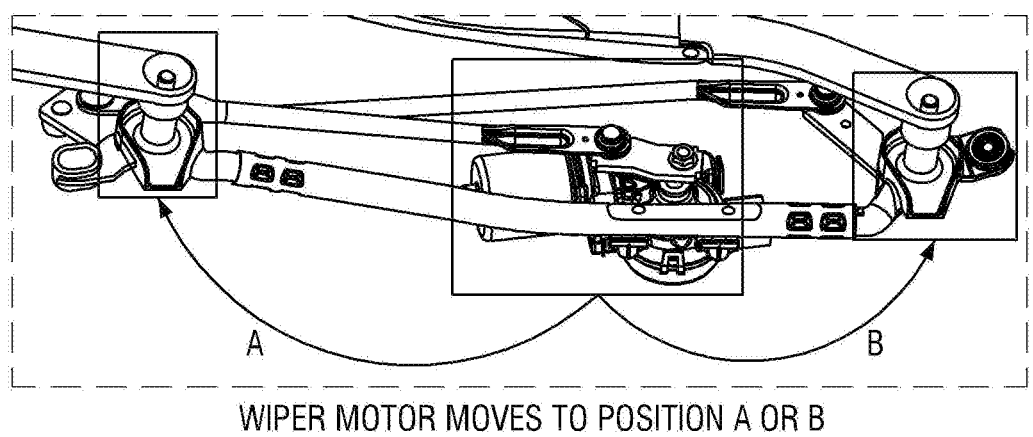
WIPER MOTOR MOVES TO POSITION A OR B
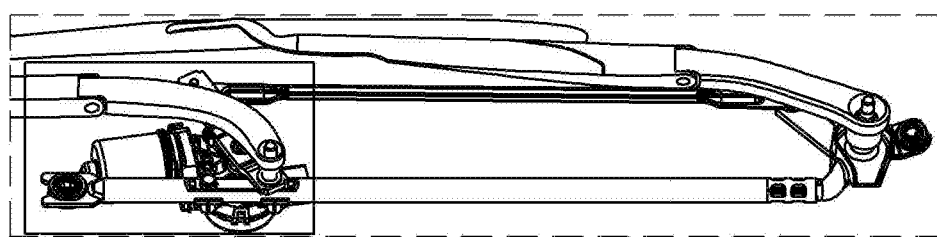

FIG. 7A "PRIOR ART"
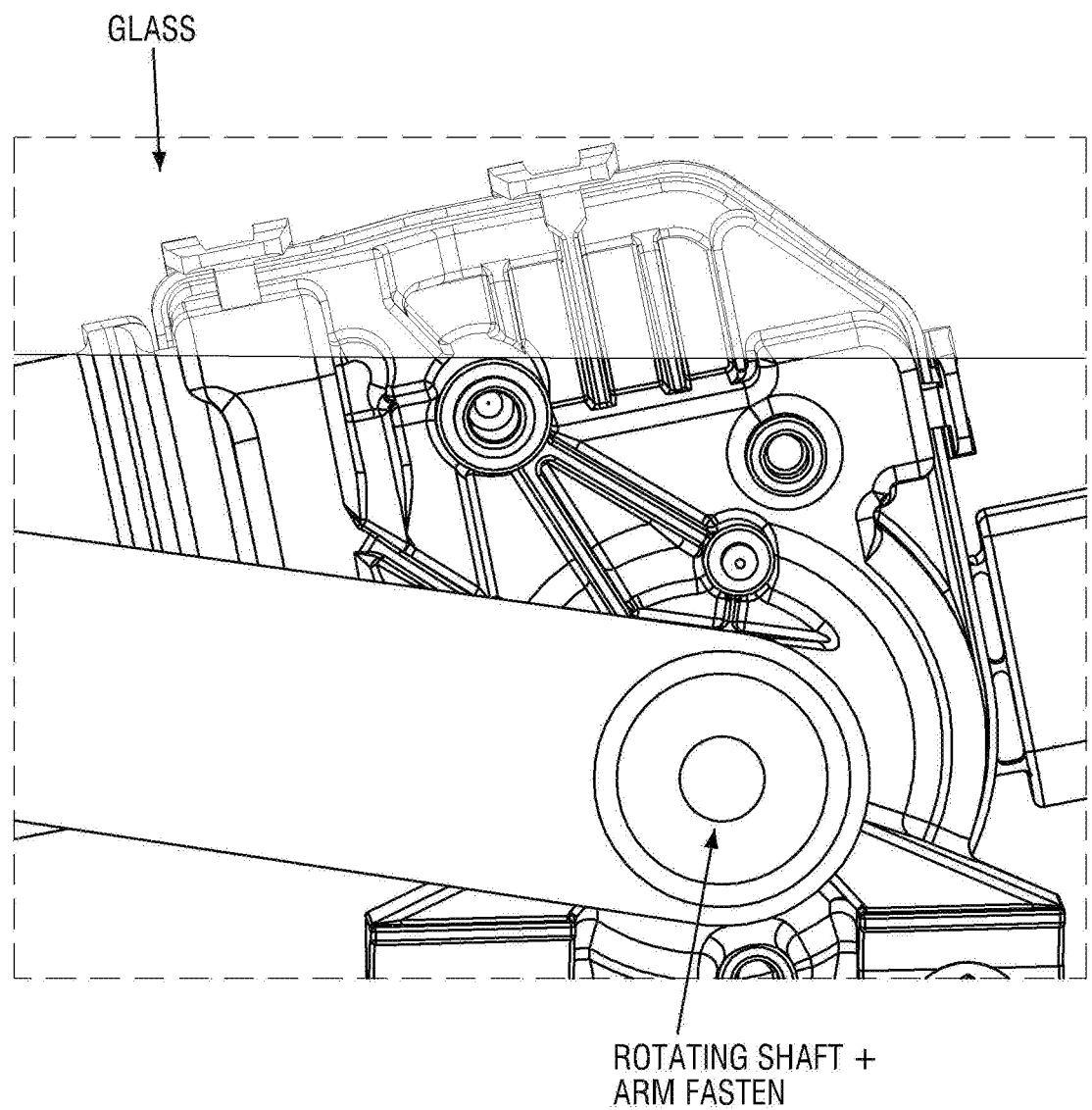

WIPER LINKAGE SYSTEM

CROSS-REFERENCE TO RELATED APPLICATION

This application claims priority to and the benefit of Korean Patent Application No. 10-2019-0166697, filed on Dec. 13, 2019, the entire contents of which are incorporated herein by reference.

FIELD

The present disclosure relates to a wiper linkage system. More particularly, the present disclosure relates to a wiper linkage system that is configured to directly transmit the forward and reverse rotating forces of a motor to an arm.

BACKGROUND

The statements in this section merely provide background information related to the present disclosure and may not constitute prior art.

Generally, a vehicle wiper device is a device that wipes dirt from a windshield glass and secures a clear view in the rain. The wiper device is configured such that a rotary motion generated by a wiper motor is transmitted through a wiper linkage system to a wiper arm, and a wiper blade is rotated within a predetermined range through the wiper arm, thus wiping the windshield glass.

Particularly, a wiper using an electronic motor has been proposed in U.S. Pat. No. 7,420,346 B2 (hereinafter "346 patent"), entitled "Wiper device for window of vehicle". As shown in FIG. 1, this is a drive arrangement of the wiper device for the vehicle window having at least two swivel mounted wiper arms 18 and 20 that are connected to each other via a crank mechanism. Here, one of the wiper arms 18 is directly coupled to a gear in a gear housing 16. The electromotive drive 10 includes a uniformly transmitting gear 14 coupled to a wiper motor 12. The transmitting gear 14 included in the gear housing 16. Furthermore, the wiper motor 12 features the rotating direction reversal of the electromotive drive 10 at each end of travel of the wiper arm 20, the electromotive drive 10 features a sensory mechanism to detect the end of the travel, and the electromotive drive features speed control.

In this case, the speed control always provides for a reduction in rotating speed of the electromotive drive 10 near the ends of travel of the wiper arms 18 and 20, at least two wiper arms 18 and 20 are coupled via a crank arm 26 and a rocker linkage 30, and both the wiper arms 18 and 20 have a moving path in the same direction.

The drive arrangement of the wiper drive configured as such makes it possible to dispense with one intermediate gear since one of the wiper arms is directly driven, i.e. without a non-uniformly transmitting intermediate gear arranged in-between. The same motor shaft may drive the other wiper arm in a conventional method through the non-uniformly transmitting intermediate gear.

The above configuration is different from a conventional configuration in only the position of the motor that is changed to an arm fastening position. Since the above configuration uses all basic components of the conventional configuration, it is difficult to expect cost reduction effects or other significant effects.

In addition to the wiper using the electronic motor configured as such, a wiper device configured as shown in FIG. 2 of the 346 patent is widely used.

The wiper device basically includes a gear housing 16 that is driven by a wiper motor 12, with a gear being installed therein, and a rocker linkage 30 (hereinafter referred to as a pipe) assembled with the gear housing 16. A crank arm 26 is coupled to an output shaft of the wiper motor 12, and a pivot housing 28 assembled with a pivot unit 27 is assembled, and a wiper arm 20 is assembled with the pivot unit 27. This device is fixed at a pivot housing mounting 29 to a vehicle body.

As seen from the above structure, the rotating force of the wiper motor 12 is transmitted through several links to two wiper arms.

We have discovered that since this configuration includes two pivot housings, link units, pivot shafts, etc., it increases the cost. Moreover, many components may cause a defect during production, increase weight, and make an assembly process complicated.

SUMMARY

The present disclosure provides a wiper linkage system that utilizes the forward and reverse rotating characteristics of a motor, so that it is possible to eliminate three components of a wiper system, including a pivot housing, a link unit, and a pivot shaft, thus reducing cost and simultaneously simplifying an assembly process.

According to one aspect of the present disclosure, a wiper linkage system includes: a gear housing installed on a wiper motor, a pipe rod installed on the gear housing, a crank arm directly coupled to an output shaft of the wiper motor, a first wiper arm installed on a first end of the crank arm by a rotating shaft, a pivot housing coupled to the pipe rod, and a second wiper arm operated by a link structure including a link unit coupled to a second end of the crank arm and the pivot housing. In particular, a first end of the pipe rod is fixed to a vehicle body by a pipe mounting.

In one form, the first wiper arm is rotated by a rotating force that is directly transmitted from the wiper motor, and the link structure further includes a link member configured to connect the link unit to the pivot housing such that the second wiper arm is operated through the pivot housing. In another form, the pivot housing is coupled to a second end of the pipe rod.

In another form, the rotating shaft is positioned below a window glass of a vehicle and an arm head part of the first wiper arm is covered by a bonnet of the vehicle during operation.

The wiper linkage system of the present disclosure has the following effects.

First, it is possible to eliminate one of a pair of pivot housings applied to a conventional wiper system, thus reducing weight and cost, and it is possible to enhance the position freedom degree of a rotating shaft due to the shape of a shaft structure of a crank arm.

Second, a wiper arm head is fastened not by a rotating shaft but by a separate shaft structure (hereinafter referred to as a rotating shaft), and the rotating shaft is positioned under a window glass, so that the exterior of a wiper arm is covered by a bonnet, thus making it easy to change the design of an appearance.

Third, after a wiper arm is assembled, the wiper arm is fixed without movement, so that an additional structure for rotating the wiper arm in a desired direction is not required.

Fourth, it is possible to reduce weight and cost, by implementing a wiper operation under a simplified condition.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram illustrating a conventional wiper driving device;

FIG. 2 is a diagram illustrating another example of a conventional wiper driving device;

FIG. 5 is a diagram illustrating the operation of the wiper linkage system in one form of the present disclosure;

FIG. 7A is a diagram illustrating a state in which conventional rotating shaft and arm are fixed on the same axis;

Figure 3:
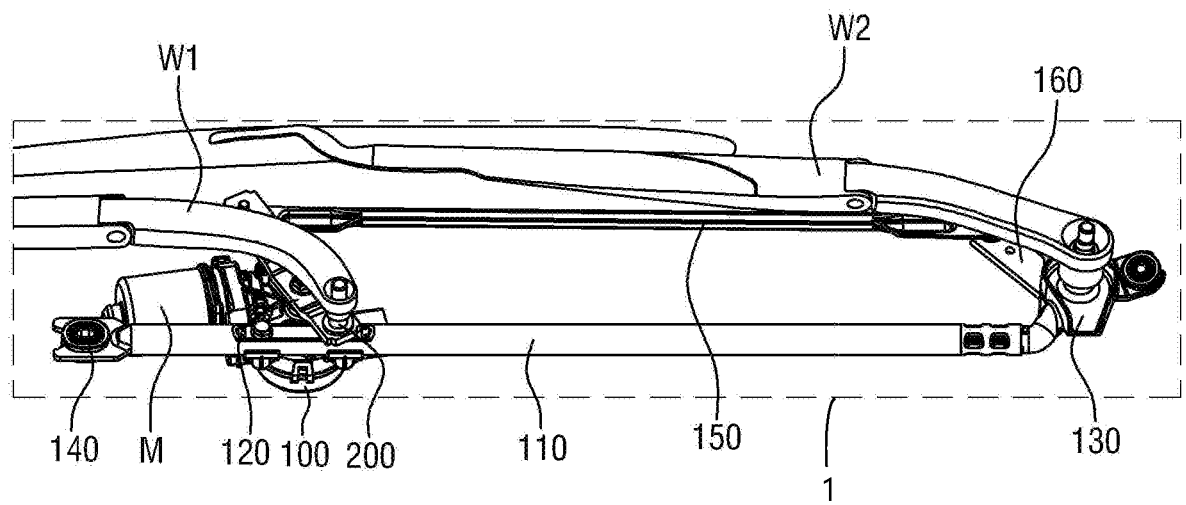
FIG. 3 is a diagram illustrating a wiper linkage system in one form of the present disclosure.
Figure 4:
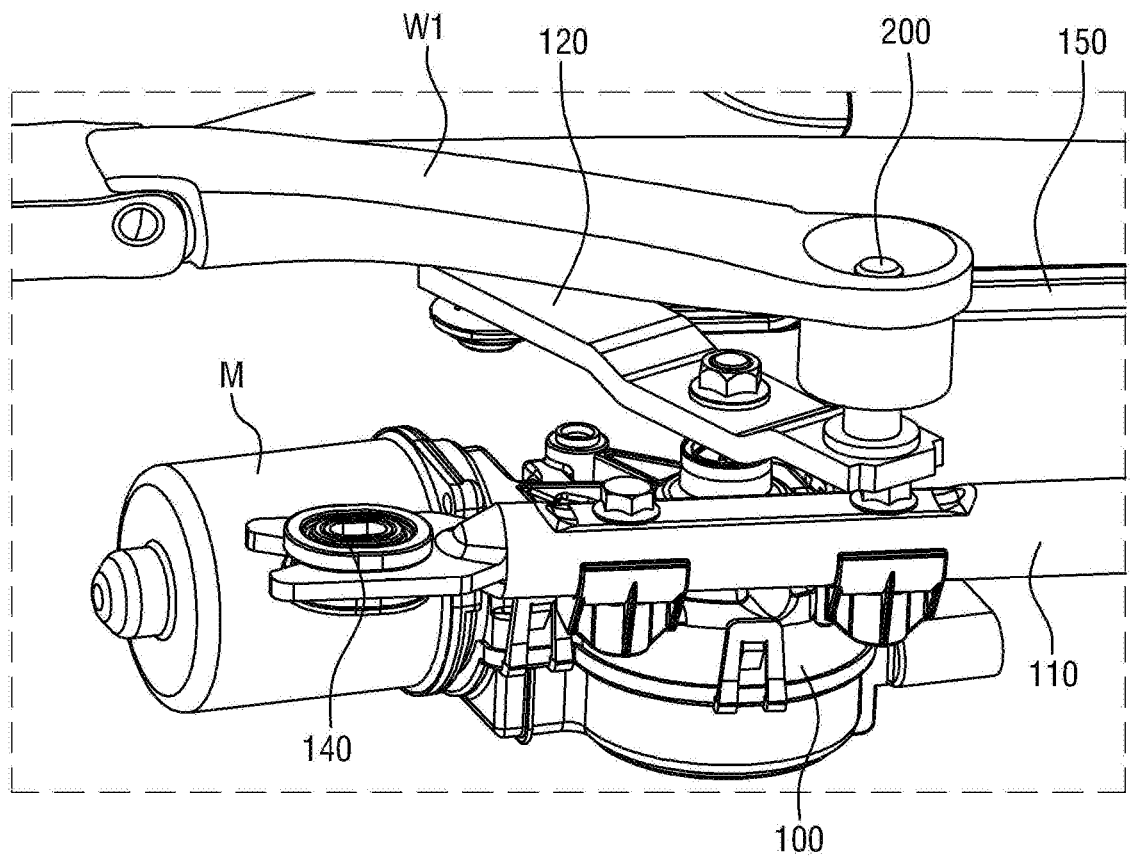
FIG. 4 is an enlarged view illustrating parts of the wiper linkage system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the attached drawings, such that those skilled in the art can easily implement the present disclosure. The present disclosure may be implemented in various forms, and is not limited to forms to be described herein below.

In the drawings, portions which are not related to the present disclosure will be omitted to explain the present disclosure more clearly.

Further, the terminologies or words used in the description and claims of the present disclosure should not be interpreted as being limited merely to common or dictionary meanings. On the contrary, they should be interpreted based on the meanings and concepts of the present disclosure in keeping with the scope of the present disclosure on the basis of the principle that the inventor(s) can appropriately define the concepts of terms so as to describe the present disclosure in the best way.

Hereinafter, exemplary forms of the present disclosure will be described in detail with reference to the accompanying drawings.

As shown in FIG. 3, a wiper linkage system 1 in one form of the present disclosure includes: a gear housing 100 installed on a wiper motor M, a pipe rod 110 assembled with the gear housing 100, a crank arm 120 and a first wiper arm W1 which are installed on an output shaft of the wiper motor M, and a pivot housing 130 installed on the pipe rod 110.

In one form, one end of the pipe rod 110 is fixed to a vehicle body by a pipe mounting 140, and a second wiper arm W2 is rotated by the pivot housing 130.

The present disclosure can enhance performance even if some of components are eliminated, unlike the related art in which two pivot housings, link units, and pivot shafts are used.

To this end, according to one form of the present disclosure, a rotating shaft 200 that is a separate shaft structure is provided on one end of the crank arm 120 to allow the first wiper arm W1 to be assembled, and a link unit 150 is installed on the other end of the crank arm to operate the second wiper arm W2.

Figure 9A:
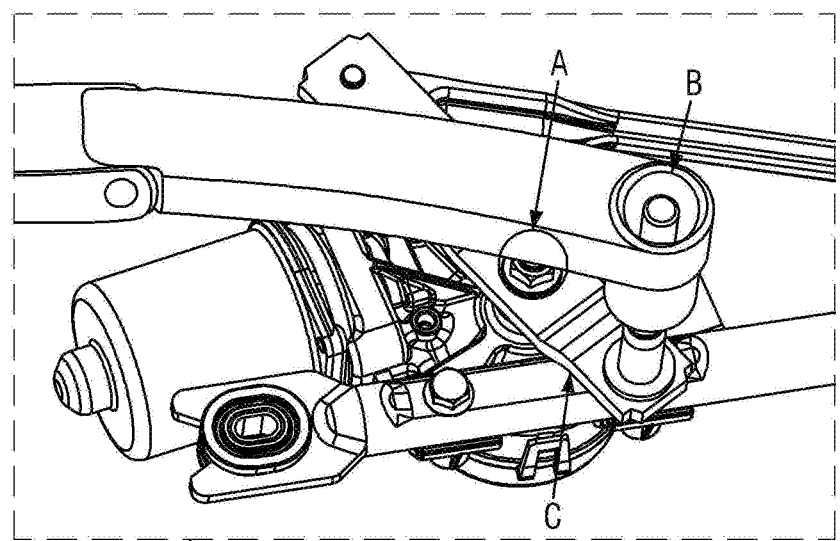
FIGS. 9A and 9B are diagrams respectively illustrating a link structure of a wiper system in one form of the present disclosure.
Figure 9B:
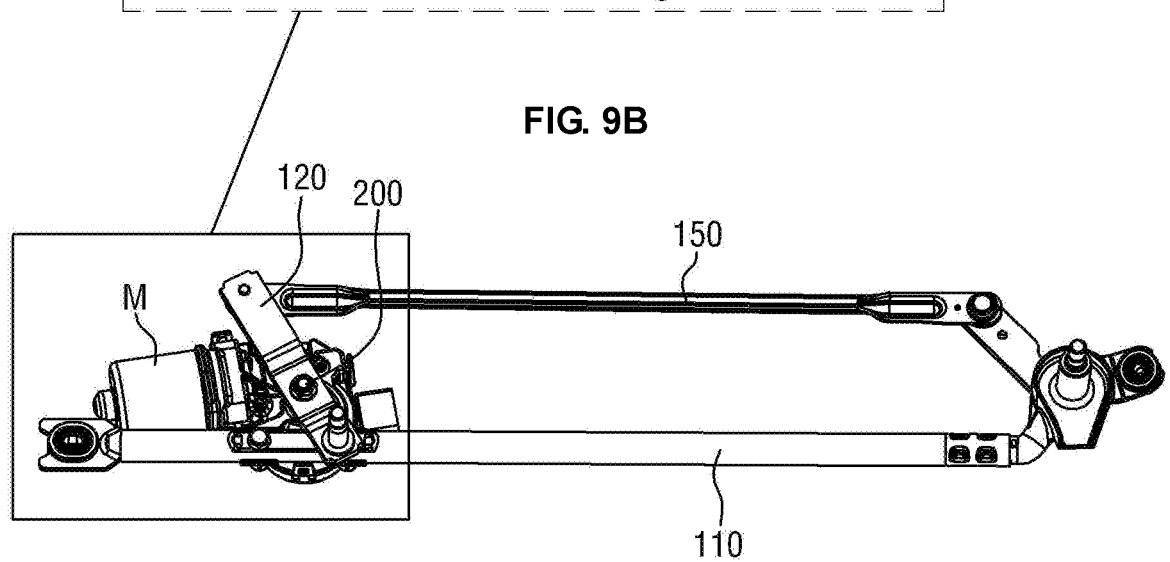

In detail, as shown in FIGS. 9A-9B, the rotating shaft 200 is installed at one end of the crank arm 120, the crank arm 120 is installed on the output shaft A of the wiper motor M, and the first wiper arm W1 is coupled to the crank arm 120 by the rotating shaft 200, such that the position freedom degree of an output part of the wiper motor M is improved.

Furthermore, the first wiper arm W1 is rotated by a rotating force that is directly transmitted from the wiper motor M, and the second wiper arm W2 is rotated via a link structure.

As shown in FIG. 3, the link structure includes the link unit 150, the pivot housing 130, and a link member 160 that connects the link unit 150 and the pivot housing to each other.

Figure 6:
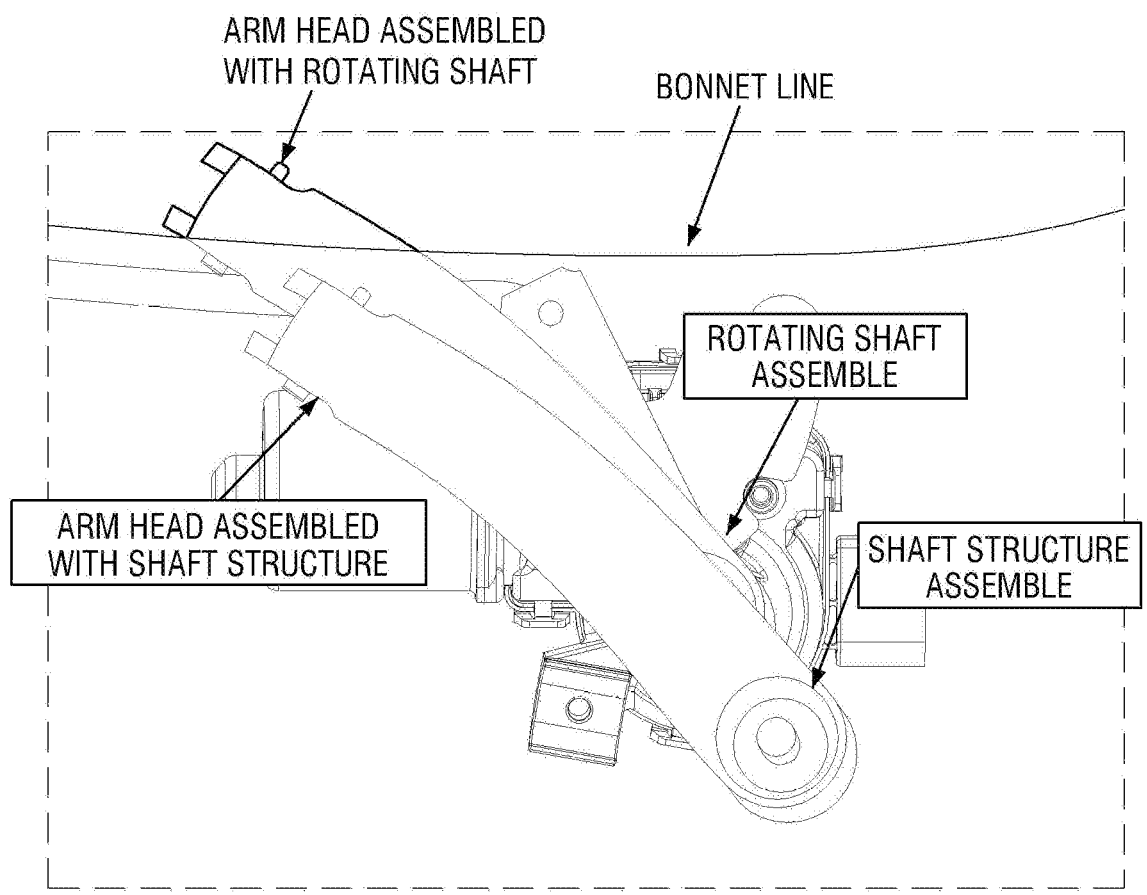
FIG. 6 is a diagram illustrating the assembled state of the wiper linkage system when viewed from an outside of a bonnet, in one form of the present disclosure.
Figure 7B:
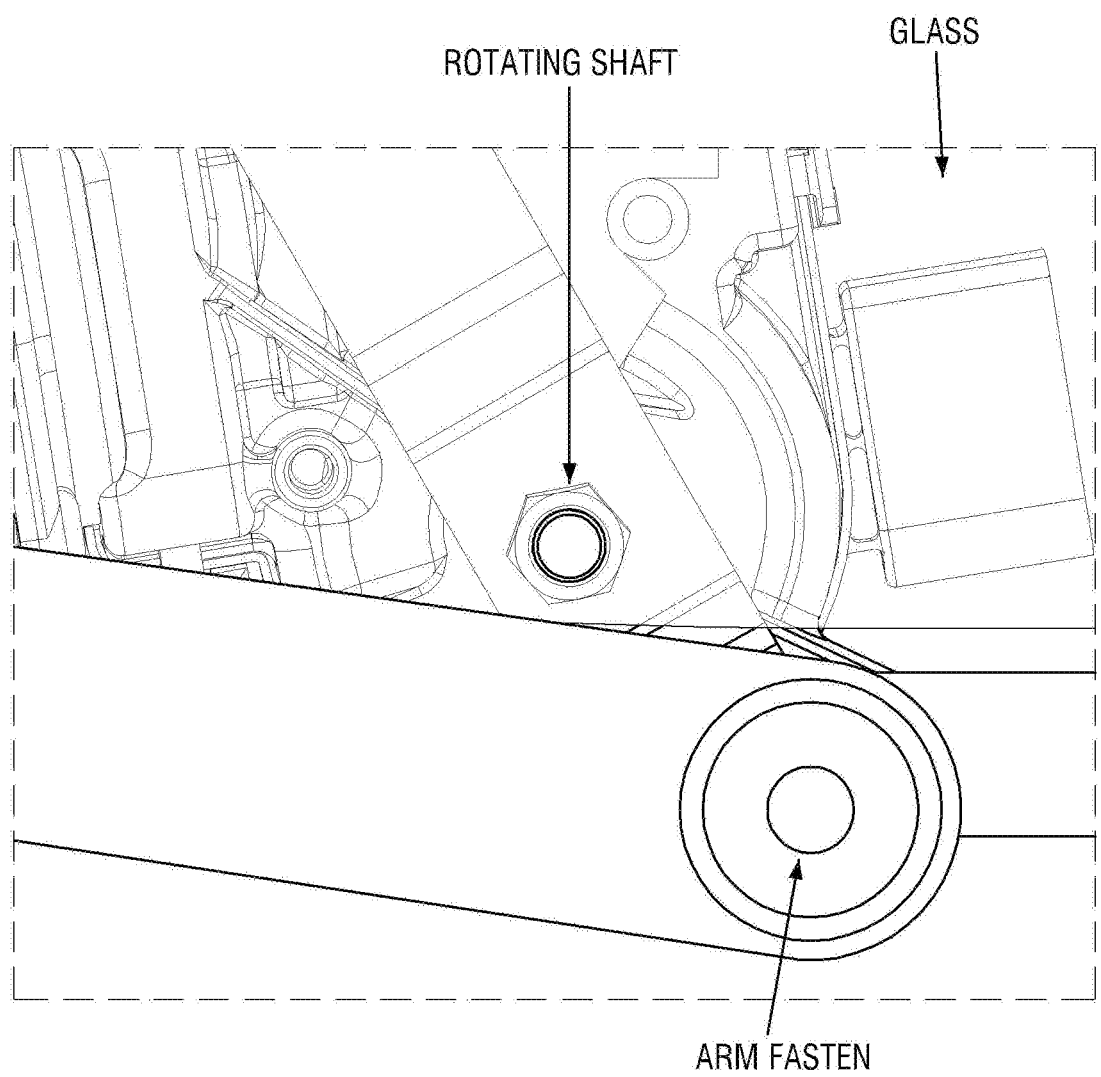
FIG. 7B is a diagram illustrating a state in which an inventive rotating shaft and an arm are separately fastened in one form of the present disclosure.

Furthermore, a head of the first wiper arm W1 is fastened not by the rotating shaft of the wiper motor M but by the rotating shaft 200 that is the separate shaft structure. As shown in FIG. 6, the rotating shaft 200 is positioned below a window glass of a vehicle, and an exterior of the wiper arm (e.g., an arm head part of the first wiper arm) is covered by a bonnet of the vehicle during the wiper arm is operating, thus making it easy to change the design of an appearance.

Figure 8:
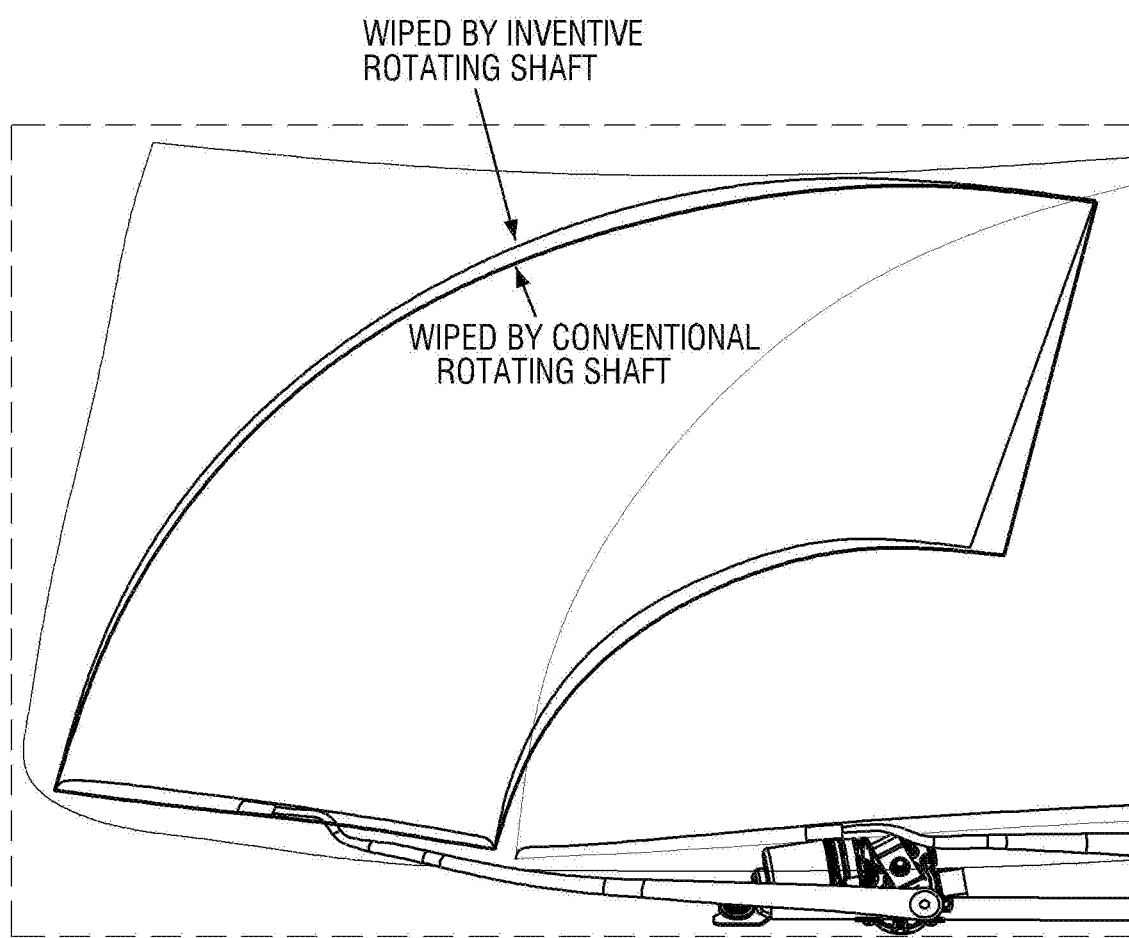
FIG. 8 is a diagram comparing a state in which glass is wiped by the conventional rotating shaft with a state in which glass is wiped by the inventive rotating shaft in one form of the present disclosure.

Furthermore, since the head of the first wiper arm is installed not by the rotating shaft of the wiper motor M but by the rotating shaft 200 that is the separate shaft structure, the wiper motor can be freely moved to position A or B as shown in FIG. 5, and it is possible to wipe a larger area as compared to the wiper arm having the conventional rotating shaft as shown in FIG. 8.

Therefore, the present disclosure is configured such that the rotating force of the motor is directly transmitted to one wiper arm W1, and the rotating force is transmitted through the link structure to the other wiper arm W2, thus simplifying a structure and reducing weight, and thereby realizing a reduction in cost.

Although the present disclosure was described with reference to specific forms shown in the drawings, it is apparent to those skilled in the art that the present disclosure may be changed and modified in various ways without departing from the scope of the present disclosure.

What is claimed is:

1. A wiper linkage system, consisting of:
a gear housing installed on a wiper motor;
a pipe rod installed on the gear housing;

a crank arm directly coupled to an output shaft of the wiper motor;
a first wiper arm installed on a first end of the crank arm by a rotating shaft;
a pivot housing coupled to the pipe rod; and
a second wiper arm operated by a link structure including a link unit coupled to a second end of the crank arm and the pivot housing,
wherein a first end of the pipe rod is fixed to a vehicle body by a pipe mounting, and
wherein the rotating shaft is positioned below a window glass of a vehicle and an arm head part of the first wiper arm is covered by a bonnet of the vehicle during operation.

2. The wiper linkage system of claim 1, wherein the first wiper arm is rotated by a rotating force that is directly transmitted from the wiper motor, and the link structure further includes a link member configured to connect the link unit to the pivot housing such that the second wiper arm is operated through the pivot housing.

3. The wiper linkage system of claim 1, wherein the pivot housing is coupled to a second end of the pipe rod.

\* \* \* \* \*